United States Patent
Baum et al.

(10) Patent No.: US 12,014,137 B2
(45) Date of Patent: Jun. 18, 2024

(54) AUTOMATED DOCUMENT PROCESSING

(71) Applicant: American Express Travel Related Services Company, Inc., New York, NY (US)

(72) Inventors: Matthew Reid Baum, New York, NY (US); Joshua Block, New York, NY (US); Ashley Sjostrom Brailey, New York, NY (US); Diana Maria Dilorio, Albany, NY (US); Zyad Gomaa, New York, NY (US); Timothy A. Osgood, Baltimore, MD (US); Magdalena Selma, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 17/948,426

(22) Filed: Sep. 20, 2022

(65) Prior Publication Data

US 2024/0095442 A1 Mar. 21, 2024

(51) Int. Cl.
*G06F 40/174* (2020.01)
*G06F 21/44* (2013.01)

(52) U.S. Cl.
CPC ............ *G06F 40/174* (2020.01); *G06F 21/44* (2013.01)

(58) Field of Classification Search
CPC ................................ G06F 40/174; G06F 21/44
See application file for complete search history.

(56) References Cited

U.S. PATENT DOCUMENTS

| 4,491,725 | A | * | 1/1985 | Pritchard | G07F 17/0014 705/40 |
|---|---|---|---|---|---|
| 4,858,121 | A | * | 8/1989 | Barber | G07F 17/0014 705/40 |
| 7,925,518 | B2 | * | 4/2011 | Lee | G06Q 20/346 705/2 |
| 8,738,405 | B2 | * | 5/2014 | Rourk | G06Q 30/04 705/35 |
| 2002/0077869 | A1 | * | 6/2002 | Doyle | G16H 40/67 705/3 |
| 2002/0120473 | A1 | * | 8/2002 | Wiggins | G16H 40/67 705/4 |
| 2002/0198831 | A1 | * | 12/2002 | Patricelli | G06Q 30/04 705/40 |

(Continued)

FOREIGN PATENT DOCUMENTS

| CA | 2531887 A1 | * | 7/2006 | .......... G06F 17/243 |
|---|---|---|---|---|
| WO | WO-8401448 A | * | 4/1984 | ............ G06Q 20/10 |

(Continued)

*Primary Examiner* — Shahid K Khan
(74) *Attorney, Agent, or Firm* — Thomas Horstemeyer, LLP

(57) ABSTRACT

Disclosed are various embodiments for automated document processing. A linked provider associated with a transaction record is identified. A submission template for the linked provider is then identified, the submission template specifying how to complete a submission using transaction data from the transaction record. Transaction data is then obtained from the transaction record. A submission is then completed based at least in part on the submission template and using the transaction data. Finally, the completed submission is then sent to a provider service associated with the linked provider.

20 Claims, 7 Drawing Sheets

(56) References Cited

U.S. PATENT DOCUMENTS

| | | | | |
|---|---|---|---|---|
| 2003/0171953 | A1* | 9/2003 | Narayanan | G06Q 10/10 705/2 |
| 2004/0006489 | A1* | 1/2004 | Bynon | G06Q 20/023 705/2 |
| 2004/0172309 | A1* | 9/2004 | Selwanes | G06Q 20/357 705/4 |
| 2004/0172310 | A1* | 9/2004 | Atlee | G06Q 40/08 705/4 |
| 2005/0033604 | A1* | 2/2005 | Hogan | G06Q 20/14 705/40 |
| 2006/0098899 | A1* | 5/2006 | King | G06F 40/169 382/305 |
| 2006/0113376 | A1* | 6/2006 | Reed | G06Q 20/04 235/383 |
| 2007/0027716 | A1* | 2/2007 | Pembroke | G06Q 40/02 705/37 |
| 2007/0033070 | A1* | 2/2007 | Beck | G06Q 20/102 705/40 |
| 2007/0194110 | A1* | 8/2007 | Esplin | G06Q 20/20 235/383 |
| 2008/0097903 | A1* | 4/2008 | Boyle | G06Q 20/382 705/40 |
| 2009/0037333 | A1* | 2/2009 | Flitcroft | G06Q 20/342 705/44 |
| 2009/0083065 | A1* | 3/2009 | Unland | G06Q 20/40 705/2 |
| 2009/0119209 | A1* | 5/2009 | Sorensen | G06Q 20/02 705/40 |
| 2014/0020073 | A1* | 1/2014 | Ronda | H04L 63/0853 726/7 |
| 2014/0278883 | A1* | 9/2014 | Wang | G06Q 30/0225 705/14.26 |
| 2014/0304010 | A1* | 10/2014 | Kennedy | G06Q 40/08 705/4 |
| 2015/0058950 | A1* | 2/2015 | Miu | G06F 21/31 726/7 |
| 2015/0112698 | A1* | 4/2015 | Boyer | G06Q 20/02 705/2 |
| 2019/0371438 | A1* | 12/2019 | Chintamaneni | G10L 15/26 |
| 2021/0165871 | A1* | 6/2021 | Jensen | G06F 21/6218 |

FOREIGN PATENT DOCUMENTS

| | | | | |
|---|---|---|---|---|
| WO | WO-2005098602 A2 | * | 10/2005 | G06F 16/316 |
| WO | WO-2012122065 A1 | * | 9/2012 | G06Q 10/00 |
| WO | WO-2013062777 A1 | * | 5/2013 | G06F 21/31 |

\* cited by examiner

AUTOMATED DOCUMENT PROCESSING

BACKGROUND

Document processing and form submissions often require lots of data collection on the part of users. Information must be compiled or acquired from various sources, and often times information or forms must be cross-referenced with other sources of information. Once the information is compiled or collected, it is then manually entered by a user into a form, which can then be submitted to the appropriate entity or service provider.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for automated document processing to improve the speed and efficiency of document and completion and submission. By using computing devices to complete forms using information already stored and readily available to the computing devices, the speed and accuracy in which documents can be process and forms can be completed can be greatly increased.

For example, many service providers often require forms to be completed to prove that a financial transaction occurred. For example, health insurance companies often require that a health insurance claim be accompanied by supporting documentation detailing the services provided and the healthcare provider who provided them. Similarly, employers often require that expense reimbursement requests include an itemized list of individual items purchased and their costs. Similarly, financial institutions (e.g., credit card issuers) that offer extended purchase protection or insurance often require proof of purchase when making a claim.

However, these forms are often difficult to complete. First, they are often inconsistent (e.g., different health insurance companies have different claim submission forms), even if they request essentially the same information. Second, they often require users to search for financial records that they may no longer have (e.g., when submitting proof of purchase for a warranty claim) because the transaction at issue occurred some time beforehand.

Fortunately, financial institutions such as credit card companies often have this information stored in their databases and maintain this information securely for an extended period of time. Financial institutions often have additional, personally identifying information (PII) that these forms require (e.g., names, addresses, phone numbers, employer name, etc.). If a credit card issuer were able to complete these forms on behalf of a user and submit them automatically, the speed at which forms could be completed would decrease dramatically, and the accuracy when completed could be increased.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
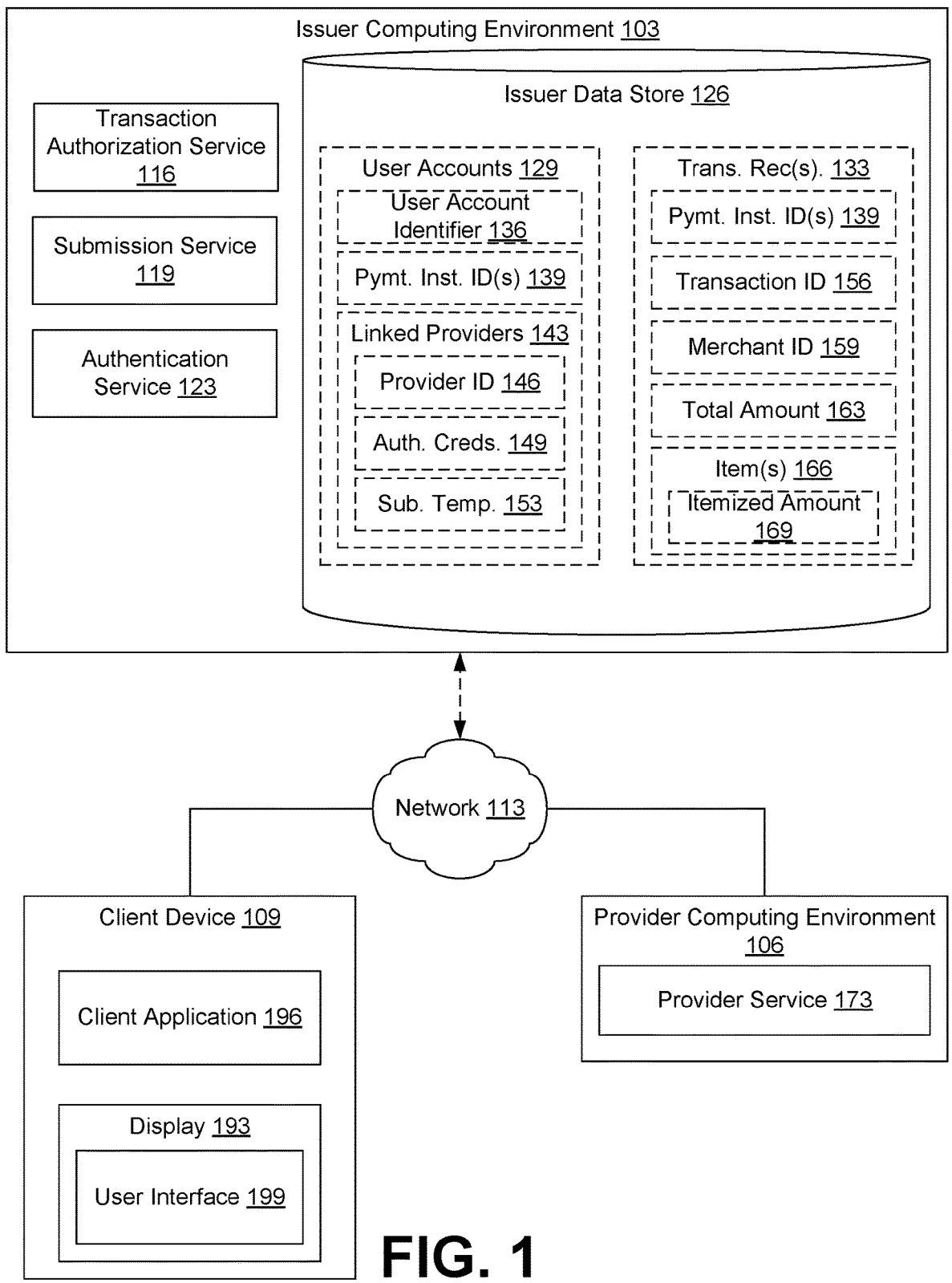
FIG. 1 is a drawing of a network environment according to various embodiments of the present disclosure.

With reference to FIG. 1, shown is a network environment 100 according to various embodiments. The network environment 100 can include an issuer computing environment 103, a provider computing environment 106, and a client device 109, which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The issuer computing environment 103 and/or the provider computing environment 106 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the issuer computing environment 103 and/or the provider computing environment 106 can employ a plurality of computing devices that can be arranged in one or more server banks or computer banks or other arrangements. Such computing devices can be located in a single installation or can be distributed among many different geographical locations. For example, the issuer computing environment 103 and/or the provider computing environment 106 can include a plurality of computing devices that together can include a hosted computing resource, a grid computing resource or any other distributed computing arrangement. In some cases, the issuer computing environment 103 and/or the provider computing environment 106 can correspond to an elastic computing resource where the allotted capacity of processing, network, storage, or other computing-related resources can vary over time.

Various applications or other functionality can be executed in the issuer computing environment 103. The components executed on the computing environment 103 include the transaction authorization service 116, the submission service 119, the authentication service 123, and other applications, services, processes, systems, engines, or functionality not discussed in detail herein.

Also, various data is stored in an issuer data store 126 that is accessible to the computing environment 203. The issuer data store 126 can be representative of a plurality of issuer data stores 126, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the issuer data store 126 is associated with the operation of the various applications or functional entities described below. This data can include one or more user accounts 129, one or more transactions 133, and potentially other data.

Each user account 129 can represent a user of a payment instrument issuer or provider, such as a debit, credit, or charge card issuer, a peer-to-peer payment network provider. Accordingly, information about the user can be stored in his or her user account 129, such as a user account identifier 136, one or more payment instrument identifiers 139, and/or one or more linked providers 143. The user account identifier 136 can represent an identifier that uniquely identifies a user account 129 with respect to another user account 129. Examples of user account identifiers 136 can include usernames, globally unique identifiers (GUIDs), universally unique identifiers (UUIDs), incremental counters or values, etc. Each payment instrument identifier 139 can represent an identifier that uniquely identifies a payment instrument (e.g., a credit card, debit card, charge card, bank account, payment account, etc.) with respect to another payment instrument. Examples of payment instrument identifiers 139 include credit, debit, or charge card numbers; bank account numbers; or tokens that obfuscate or provide an alias for debit, credit, charge, or bank account numbers.

Each linked provider 143 can represent a provider associated with the user. Examples of linked providers 143 could include insurance companies, employers, or other organizations or entities that a user might wish to automatically submit transaction information to. Each linked provider can include, for example, a provider identifier 146, one or more authentication credentials 149, and one or more submission templates 153. The provider identifier 146 can represent the identifier of a linked provider 143. The authentication credentials 149 can represent any stored credentials (e.g., authentication or authorization token, stored username and password, etc.) that could be used by the submission service 119 to interact with the provider service 173 on behalf of the user. The submission template 153 can specify how and which data from a user account or a transaction record 133 linked to the user account 129 is to be presented to the provider service 173 of a provider. Submission templates 153 could, for example, represent how a form of a provider is structured and should be completed.

Each transaction record 133 can represent an interaction with a third-party involving the payment of funds for goods or services. Each transaction record 133 can include information such as the payment instrument identifier 139 used for the transaction record 133, a transaction identifier 156, a merchant identifier 159, a total amount 163 of the transaction record 133, and one or more items 166 involved in the transaction record 133. The transaction identifier 156 can represent any identifier that uniquely identifies a transaction 13 with respect to another transaction record 133. The merchant identifier 159 represents any identifier that uniquely identifies a merchant involved as a counterparty to the transaction record 133 with respect to another merchant. The total amount 163 represents the total amount of funds involved in the transaction. Each item 166 can represent data about individual items involved in the transaction, such as the name, type, or nature of the item, including the itemized amount 169 representing the individual cost or price of the item 166 in the transaction record 133. Data about a transaction record 133 could be submitted by a merchant to the transaction authorization service 116 as part of a transaction authorization request (e.g., as part of a request to authorize a credit or debit card payment) or could be provided subsequent to the occurrence of a transaction record 133 (e.g., as part of a batch synchronization of transaction record 133 data between a merchant and the issuer).

The transaction authorization service 116 can be executed to authorize transactions 133 made using a payment rail. For example, the transaction authorization service 116 could be executed to receive credit or charge card transactions from a merchant, evaluate the transaction, and authorize it for payment. Similarly, the transaction authorization service 116 could be executed to receive debit card transactions from a merchant, evaluate the transaction, and authorize it for payment.

The submission service 119 can be used to submit user account 129 or transaction record 133 data to a provider service 173 of a provider. In some implementations, the submissions could be performed using or based upon a submission template 153. In other implementations, submissions to the provider service 173 could rely upon the results of various machine learning and/or computer vision techniques.

The authentication service 123 can be executed to authenticate a user who has a user account 129 with an issuer. The authentication service 123 can also be executed to verify or authenticate that a particular transaction record 133 involving the user occurred or was performed.

Various applications or other functionality can be executed in the provider computing environment 106. The components executed by the provider computing environment 106 include the provider service 173, and other applications, services, processes, systems, engines, or functionality not discussed in detail herein.

The provider service 173 can be executed to receive completed submissions of forms or documents prepared by the submission service 119 using submission templates 153 stored in the user account 129 of the user.

The client device 109 is representative of a plurality of client devices that can be coupled to the network 113. The client device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 109 can include one or more displays 193, such as liquid crystal displays (LCDs), gas plasma-based flat panel displays, organic light emitting diode (OLED) displays, electrophoretic ink ("E-ink") displays, projectors, or other types of display devices. In some instances, the display 193 can be a component of the client device 109 or can be connected to the client device 109 through a wired or wireless connection.

The client device 106 can be configured to execute various applications such as a client application 196 or other applications. The client application 196 can be executed in a client device 109 to access network content served up by the issuer computing environment 103, the provider computing environment 106, or other servers, thereby rendering a user interface 199 on the display 193. To this end, the client application 196 can include a browser, a dedicated application, or other executable, and the user interface 199 can include a network page, an application screen, or other user mechanism for obtaining user input. The client device 106 can be configured to execute applications beyond the client application 196 such as email applications, social networking applications, word processors, spreadsheets, or other applications.

Next, a general description of the operation of the various components of the network environment 100 is provided. Although the following description provides a general description of the interactions between the various components of the network environment 100, other interactions are also encompassed by the various embodiments of the present disclosure.

To begin, a user can make a purchase with a merchant. As part of the purchase, the merchant's point of sale (PoS) hardware or software service could send an authorization request to the transaction authorization service 116. The transaction authorization service 116 could then evaluate the transaction identified by the authorization request and determine whether to authorize the transaction or not. Assuming the transaction is authorized, the transaction authorization service could create and save a transaction record 133 in the issuer data store 126.

Subsequently, the submission service 119 could automatically identify the transaction record 133 and prepare a submission to the provider service 173. For example, the submission service 119 could regularly scan or query the issuer data store 126 for transaction records 133 that are associated with a user account 129 and meet various criteria (e.g., merchant identifier 159 is for a health care provider). The submission service 119 could then determine whether any linked providers 143 for a user account 129 match submission criterion for the user account 129. For example, if a user has requested that the submission service 119 automatically submit transaction records 133 involving health care providers to a health insurance provider, the submission service 119 could determine whether any of merchant identifiers 159 of any transaction records 133 associated with the user are for a healthcare provider and then the submission service 119 could submit a claim to a previously specified health insurance provider listed as a linked provider 143 of a user. However, in other implementations, the submission service 119 might obtain a manual selection of transaction records 133 from a user. The identified transaction records 133 could then be submitted to a linked provider 143 selected by the user.

To make a submission, the submission service 119 could then select and evaluate a submission template 153 for the linked provider 143. The submission template 153 could, for example, specify how a form is supposed to be filled out for a provider (e.g., a claim form for a health insurance provider or a claims form for a warranty provider). The submission service 119 could then complete the form in the manner specified by the submission template 153 using the information from the selected transaction record(s) 133. Once complete, the submission service 119 could then provide the completed form to the provider service 173.

In some instances, however, a provider service 173 may alternatively want to confirm that a user has made a purchase. For example, if a provider collects or displays reviews of a product or service, the provider may wish to verify whether the user submitting the review has actually made a purchase of a particular product or with a particular merchant. In these implementations, the provider service 173 could provide a user with a request to authenticate himself or herself. The user could be redirected to the authentication service 123, where he or she can authenticate his or her user account 129. Once authenticated, the provider service 173 can query the authentication service 123 to authenticate the user's transaction history. For example, in order to let a user submit a review of a merchant, the provider service 173 may send a request to the authentication service 123 to confirm whether any transaction records 133 with a matching merchant identifier 159 are associated with the user account 129 of the user in order to confirm that the user submitting the review of the merchant is a prior customer of the merchant. In a similar example, in order to let a user submit review of particular good or service, the provider service 173 may send a request to the authentication service 123 to confirm whether any transaction records 133 with a matching item 166 are associated with the user account 129 of the user in order to confirm that the user submitting the review of the item is a prior purchaser of the item. The results of the authentication could then be returned to the provider service 173, which could let the user submit a review or mark a submitted review as verified based at least in part on the results returned by the authentication service 123.

Figure 2:
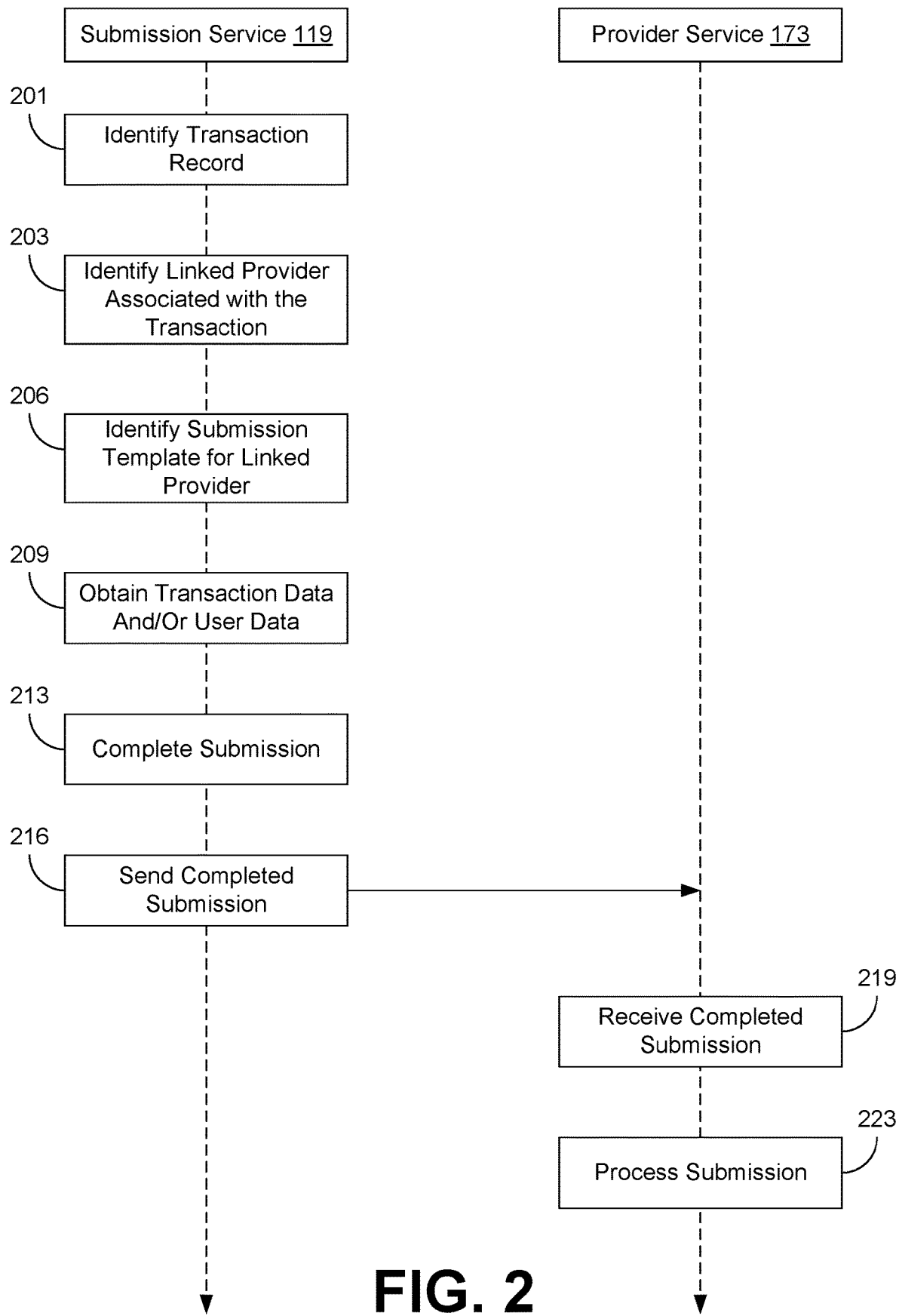
FIGS. 2 and 3 are sequence diagrams depicting the interactions between the various components of the network environment of FIG. 1 according to various embodiments of the present disclosure.

Referring next to FIG. 2, shown is a sequence diagram that provides one example of the interactions between the submission service 119 and the provider service 173. The sequence diagram of FIG. 2 provides merely an example of the many different types of functional arrangements that can be employed by the submission service 119 and/or the provider service 173. As an alternative, the sequence diagram of FIG. 2 can be viewed as depicting an example of elements of a method implemented within the network environment 100.

Beginning with block 201, the submission service 119 can identify one or more new transaction records 133 to be processed. In some instances, this could be done periodically and automatically on behalf of a user (e.g., because a user has previously authorized or instructed the submission service 119 to prepare submissions to the provider service 173 on behalf of the user). In other instances, this could be done in response to a user request (e.g., because a user is beginning a process to select one or more transaction records 133 for submission to the provider service 173).

Referring next to block 203, the submission service 119 can identify a linked provider 143 associated with the transaction record 133. For example, if a user has previously registered a health insurance provider as a linked provider 143, and the submission service 119 determines that the transaction record 133 is for a healthcare provider based at least in part on the merchant identifier 159 of the transaction record 133, then the submission service 119 could identify the health insurance provider as the linked provider 143. As another example, if a user has registered his or her employer as a linked provider 143 for expense reimbursement purposes, and the submission service determines that the transaction record 133 is for a work-related expense based at least in part on the merchant identifier 159 or an item 166 listed in the transaction record, then the submission service 119 could identify the employer as the linked provider 143. For example, if the merchant identifier 159 were for an airline, hotel, or office supply store, then the submission service 119 could identify the employer as the linked provider 143.

Then, at block 206, the submission service 119 can identify the appropriate submission template 153 to be used for submitting the transaction data in the transaction record 133 to the provider service 173 of the linked provider 143. For example, if the linked provider 143 were a health insurance company, then the submission service 119 might select the submission template 153 that provides instructions for how to format a claim for services. As another example, if the linked provider 143 were the employer of the user, then the submission service 119 might select the submission template 153 that provides instructions for how to complete an expense reimbursement form for the employer.

Next, at block 209, the submission service 119 can obtain the appropriate transaction data and/or user data to complete the submission. For example, a submission template 153 for a health insurance claim form might specify that identity of the healthcare provider and an itemized list of services be included in the claims form. The submission service 119 could therefore retrieve the merchant identifier 159 from the transaction record 133 and the items 166 from the transaction record 133. However, a submission template 153 for an expense reimbursement form might only specify that a list of items purchased and the amount for each item be included in the expense report. The submission service 119 could therefore retrieve the items 166 purchased from the transaction record 133 and the itemized amount 169 for each item 166.

Moving on to block 213, the submission service 119 could complete the submission using the transaction data obtained at block 209. The submission service 119 could follow the instructions included in the submission template 153 identified at block 206 to complete a submission form for the provider. This could include entering the transaction data in the appropriate locations on a form (e.g., a health insurance claim form or an expense reimbursement form) where identified by the submission template 153. In some implementations, the form could include predefined blocks or locations where the data can be entered. However, in other implementations, the form could change over time, and in these implementations computer vision and machine learning techniques could be used to perform optical character recognition on the form in order to determine where particular portions of the transaction data should be provided or entered.

Proceeding to block 216, the completed submission can be sent to the provider service 173 of the linked provider 143. For example, the submission service 119 could use the authentication credentials 149 of the user to login to or authenticate with the provider service 173 on behalf of the user. The submission service 119 could then send the completed submission to the provider service 173.

Subsequently, at block 219, the provider service 173 could receive the completed submission and, at block 223, perform any actions needed to process the submission. This could include, for example, determining whether any individual items 166 listed in an expense report are prohibited by company policy, determining whether the merchant identifier 159 is for a healthcare provider that is in or out of network, etc.

Figure 3:
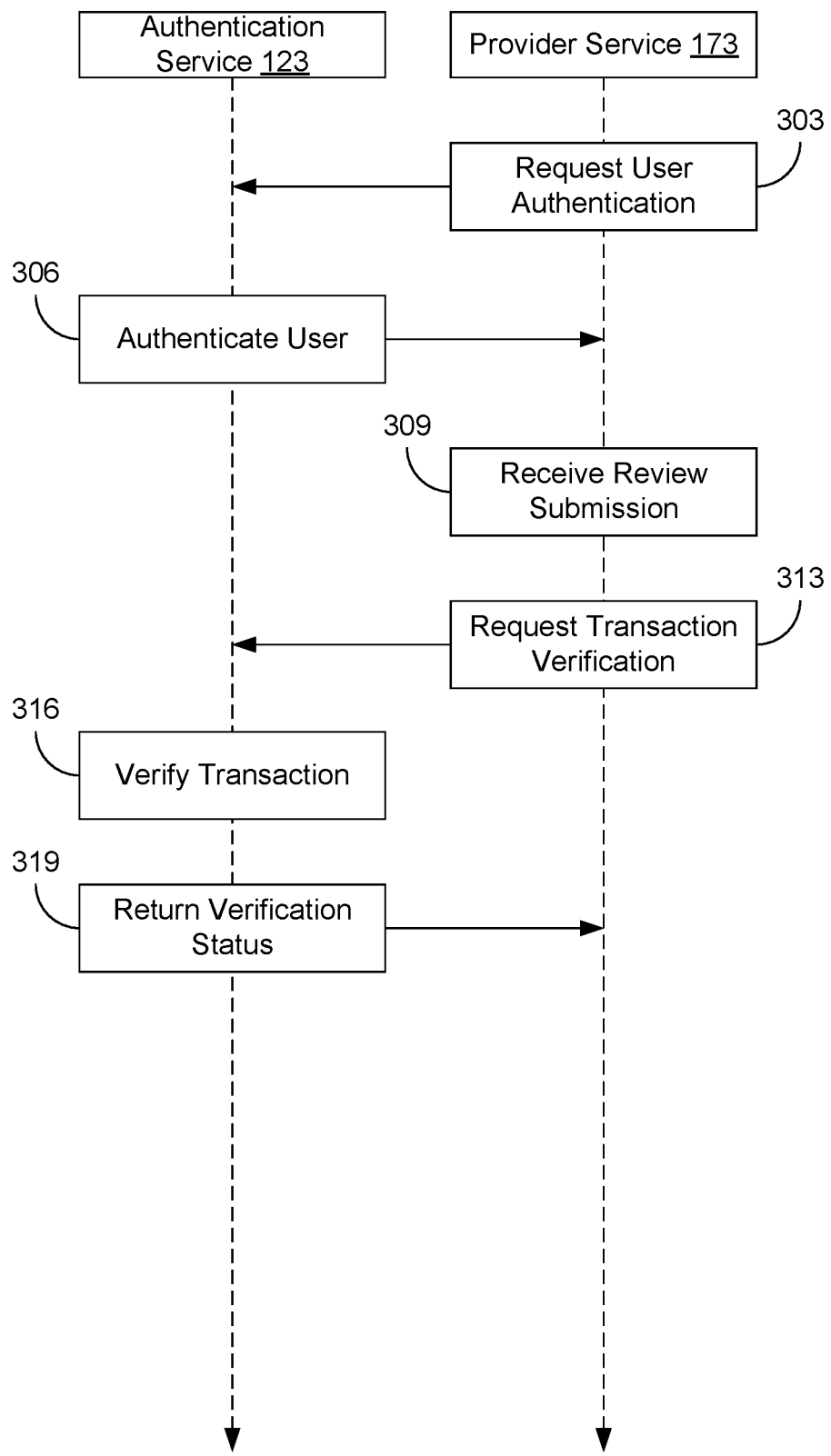

Referring next to FIG. 3, shown is a sequence diagram that provides one example of the interactions between the submission service 119 and the authentication service 123. The sequence diagram of FIG. 3 provides merely an example of the many different types of functional arrangements that can be employed by the submission service 119 and the authentication service 123. As an alternative, the sequence diagram of FIG. 3 can be viewed as depicting an example of elements of a method implemented within the network environment 100.

Beginning with block 303, the provider service 173 can send a request to the authentication service 123 to authenticate the user. This could be done, for example, if a user is attempting to login with the provider service 173 and the provider service 173 wishes to rely on a third-party (e.g., a social media website, a bank or other credit or debit card issuer, etc.) to authenticate the user's identity. The authentication request could, for example, be made in the form of a redirect from the website or application of the provider service 173 to the authentication service 123, such as a redirect from a login page of the provider service 173 to the login page of the authentication service 123.

Next, at block 306, the provider service 173 can authenticate the user. This could for example, involve comparing authentication credentials provided by the user to authentication credentials stored in the user account 129 of the user. If the authentication credentials match, then the user is authenticated. An authentication token could then be generated and provided by the authentication service 123 to the provider service, such as a security assertion markup language (SAML) token.

Subsequently, at block 309, the provider service 173 can receive a review submission from a user. The request could include an identification of a merchant being reviewed (e.g., a merchant identifier 159) and/or an item being identified (e.g., an item 166). The request could also include information in the form of a review itself (e.g., a rating and/or free-form text provided by the user describing his or her perceptions or experience).

Then, at block 313, the provider service 173 could send a transaction verification request to the authentication service 123. The transaction verification request could include information such as the authentication token provided at block 306 to the provider service 173 that identifies the user, as well as the merchant identifier 159 or item 166 being reviewed.

Accordingly, at block 316, the authentication service 123 could verify whether the user has engaged in any transactions involving the merchant or item being reviewed. For example, the authentication service 123 could search for a user account 129 identified by the previously issued authentication token. Then, the authentication service 123 could search for any transaction records 133 involving a payment instrument identifier 139 of a payment instrument (e.g., a credit, debit, or charge card) associated with the user account 129 that also match either the merchant identifier 159 or the item 166 provided by the provider service 173. If any transaction records 133 matching the merchant identifier 159 or item 166 included in the transaction verification request are associated with the user account 129 of the user, then the authentication service 123 can conclude that the user did make a purchase with the merchant or did make a purchase of the item 166. If no matching transaction records 133 are found, then the authentication service 123 can conclude that the user did not make any purchase with merchant or of the item 166.

Finally, at block 319, the verification status determined at block 316 can be returned to the provider service 173. The provider service 173 can use the verification status to determine whether or not to accept the review or to provide additional context that review involves a user who has been verified as having made the purchase with the merchant or of the goods or services being reviewed.

Figure 4A:
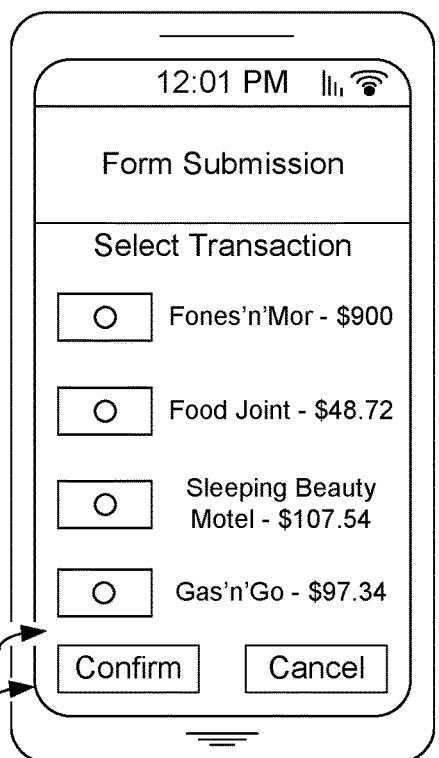
FIGS. 4A-4E are user interface diagrams depicting user interactions with various embodiments of the present disclosure.

FIGS. 4A-1E illustrate examples of how a user might interact with a client device 109 to manually select one or more transaction records 133 for submission to a provider service 173. However, a user could interact with his or her client device 109 in other manners to select one or more transaction records 133 for submission to a provider service 173.

FIG. 4A depicts a client device 109 with a display 193 according to various embodiments of the present disclosure. A user interface 199a can be rendered on the display 193 of the client device 109. As illustrated, one or more transaction records 133 can be presented within the user interface 199a. A user could select one or more transaction records 133 for submission to a provider service 173.

Figure 4B:
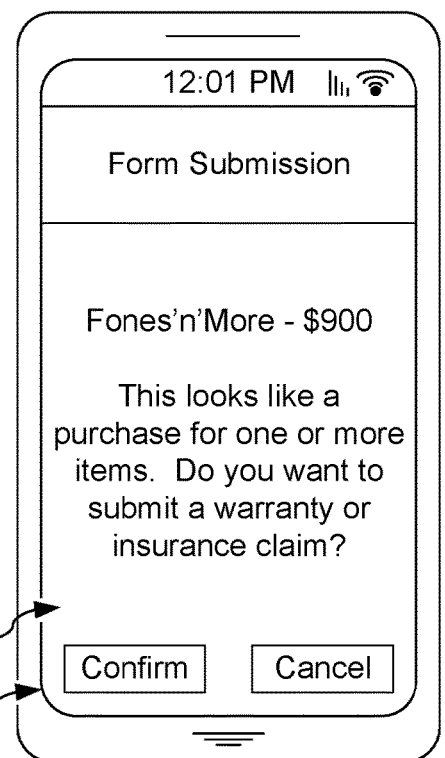

FIG. 4B depicts a client device 109 with a display 193 according to various embodiments of the present disclosure. A user interface 199b can be rendered on the display 193 of the client device 109. As illustrated, a confirmation screen can be presented within the user interface 199b. The confirmation screen can identify the type of transaction record 133 the user has selected (e.g., a purchase of items) and the type of linked provider 143 the user would like to submit the transaction record 133 to, as well as the type of submission (e.g., a warranty or insurance claim). The type of linked provider 143 and the type of submission could be identified using various approaches. For example, machine learning could be employed by the submission service 119 to determine which linked provider(s) 143 a user is most likely to want to submit the transaction record 133 to and the reason for the submission.

Figure 4C:
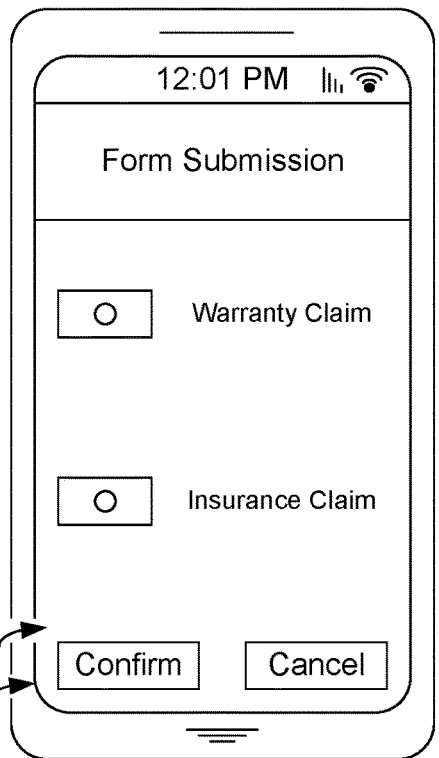

FIG. 4C depicts a client device 109 with a display 193 according to various embodiments of the present disclosure. A user interface 199c can be rendered on the display 193 of the client device 109. As illustrated, a user can select the linked provider 143 and/or the type of submission template 153 corresponding to the type of submission the user wishes to make. As illustrated, here, the user can make a warranty claim (e.g., because a previously purchased item no longer works), or an insurance claim (e.g., because a previously purchased item was lost or stolen). The different types of submissions could be submitted to different linked providers 143 using different submission templates 153 (e.g., one company handles warranty claims and another handles insurance claims) or to the same linked provider using different submission templates 153 (e.g., because the same company handles both warranty claims and insurance claims, but requires different information and different forms to be completed for each type of claim).

Figure 4D:
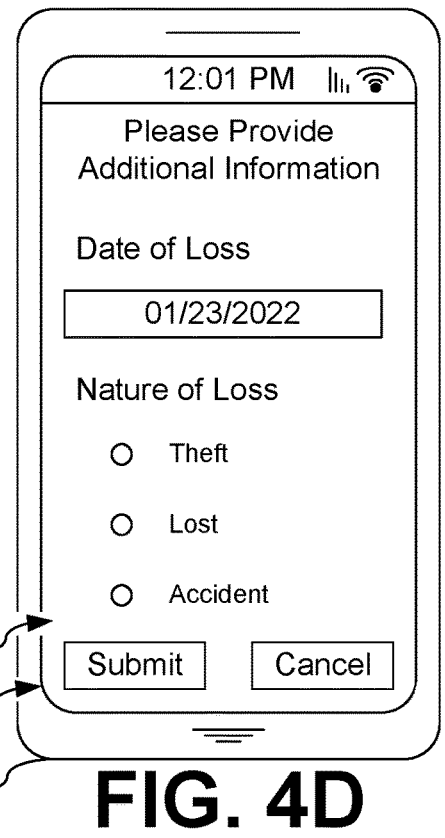

FIG. 4D depicts a client device 109 with a display 193 according to various embodiments of the present disclosure. A user interface 199d can be rendered on the display 193 of the client device 109. As illustrated, the user could have previously selected an "Insurance Claim" in FIG. 4C. Therefore, additional information required by the submission template 153 for the linked provider 143 for insurance claims is presented to the user. This information can include any additional information that would not be in the transaction record 133, such as the date of the loss, the nature of the loss, and potentially other information. Similar questions could be used for a warranty claim or any other type of claim.

Figure 4E:
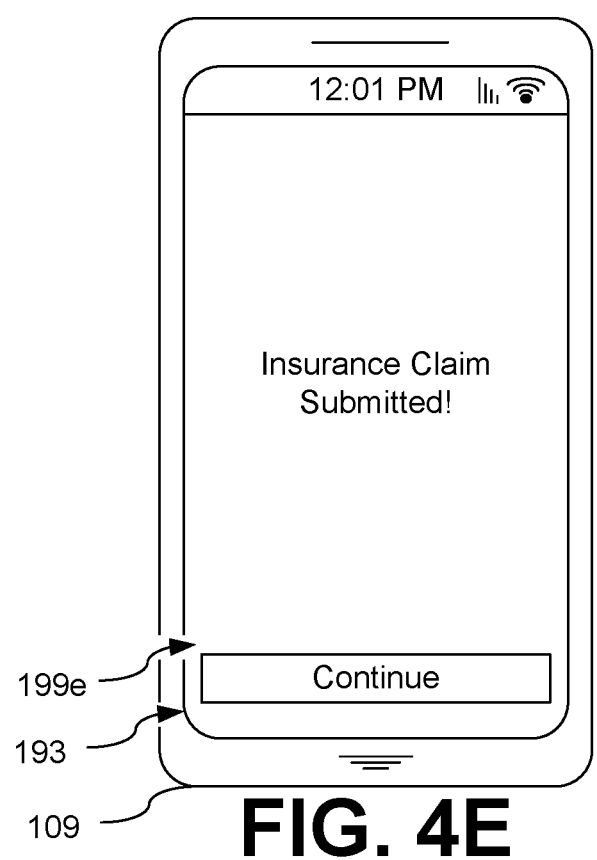

FIG. 4E depicts a client device 109 with a display 193 according to various embodiments of the present disclosure. A user interface 199e can be rendered on the display 193 of the client device 109. As illustrated, the user's submission of the insurance claim is completed and confirmed. No further information is requested from the user.

FIGS. 5A-5E illustrate examples of how a user could submit a verified review according to various embodiments of the present disclosure. Although FIGS. 5A-5E illustrate an example of how a recipient could submit a verified review, other similar approaches are also encompassed by various embodiments of the present disclosure.

Figure 5A:
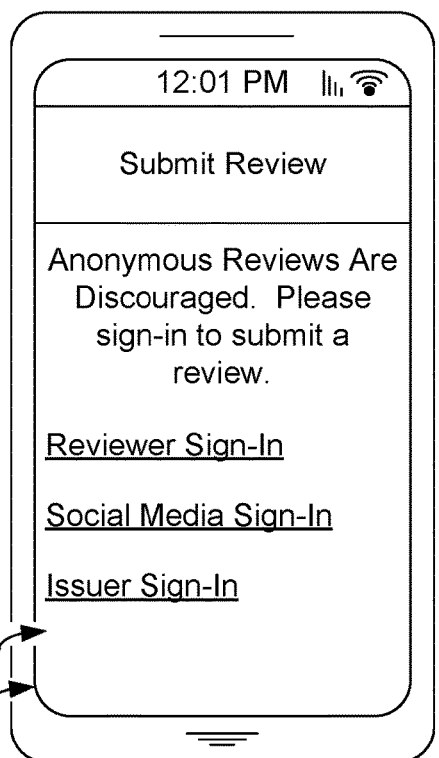
FIGS. 5A-5E are user interface diagrams depicting user interactions with various embodiments of the present disclosure.

FIG. 5A depicts a client device 109 with a display 193 according to various embodiments of the present disclosure. A user interface 199f can be rendered on the display 193 of the client device 109. As illustrated, the user interface 199f can include a list of sign-in or authentication options. One could be using a sign-in process of the review provider. Another option could be to login or authenticate oneself using a social media account. A third option could be to login using credentials provided by an issuer of a payment instrument (e.g., a credit, debit, or charge card provider).

Figure 5B:
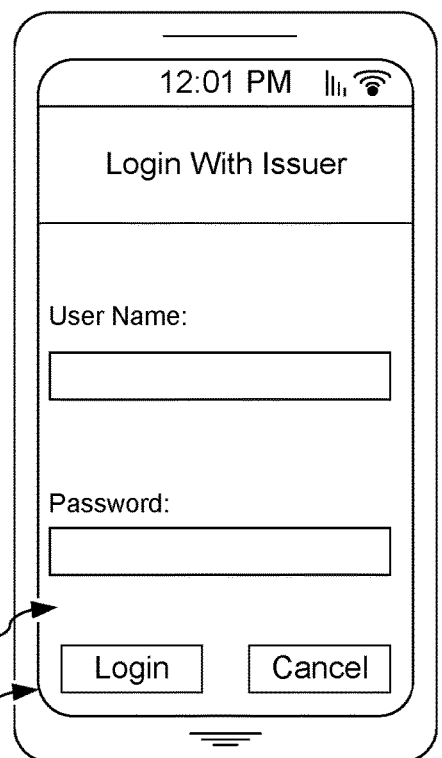

FIG. 5B depicts a client device 109 with a display 193 according to various embodiments of the present disclosure. A user interface 199g can be rendered on the display 193 of the client device 109. As illustrated, the user interface 199g can prompt a user to provide authentication credentials (e.g., a user name and password) to authenticate with the authentication service 123.

Figure 5C:
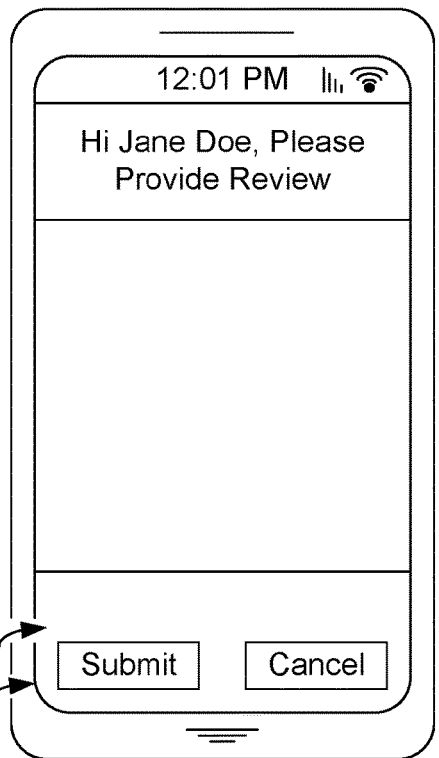

FIG. 5C depicts a client device 109 with a display 193 according to various embodiments of the present disclosure. A user interface 199h can be rendered on the display 193 of the client device 109. As illustrated, the user interface 199h can provide a user with the ability to submit a review (e.g., of a merchant or for an item that had been previously purchased). The user interface 199h could be presented to the user, for example, after he or she has previously authenticated himself or herself with the authentication service 123 using the user interface 199g.

Figure 5D:
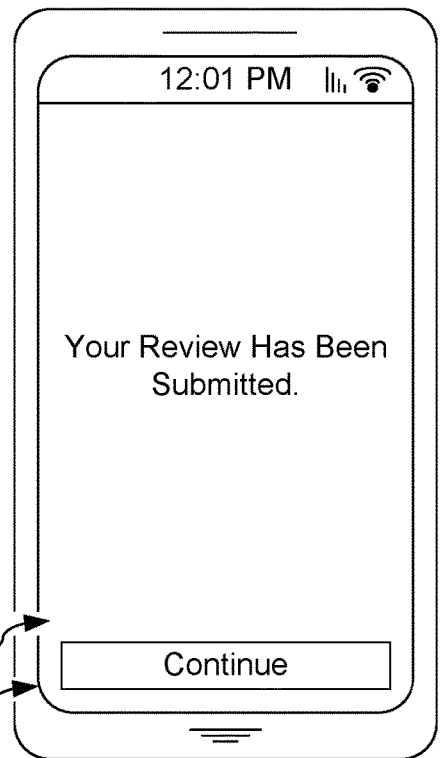

FIG. 5D depicts a client device 109 with a display 193 according to various embodiments of the present disclosure. A user interface 199i can be rendered on the display 193 of the client device 109 to allow the recipient to a confirmation that the review entered using the user interface 199h has been received.

Figure 5E:
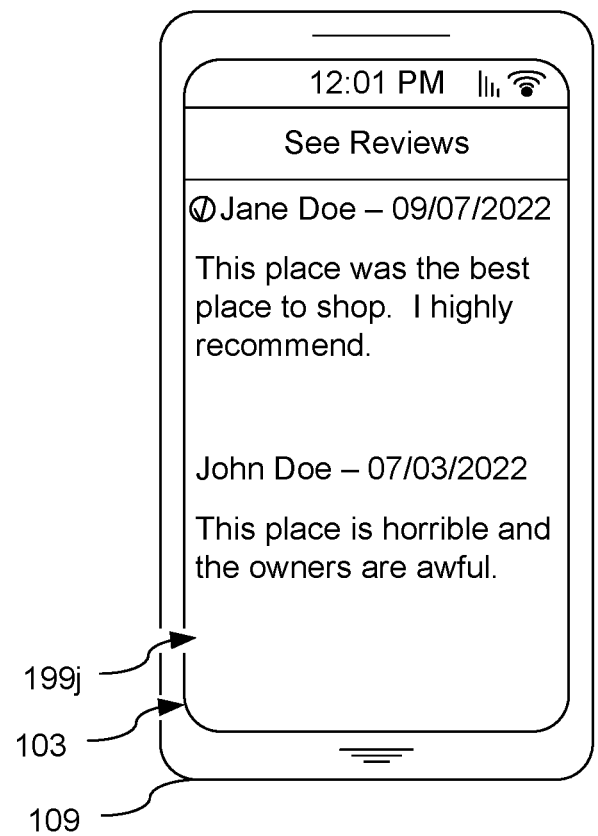

Subsequently, at FIG. 5E, a client device 109 with a display can render a user interface 199j on the display 193 of the client device 109. The review that had been previously submitted can be indicated as having been verified (e.g., using a checkmark or other status indicator). The verified status can represent that user has actually made a purchase from the merchant being review and/or has purchased the item being reviewed. These reviews might be considered more trustworthy to other users compared to reviews that are anonymous or where the user cannot or has not been confirmed to have made a purchase from the merchant or of the item.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory; and
    machine-readable instructions stored in the memory that, when executed by the processor, cause the computing device to at least:
        identify a transaction record and a user account associated with the transaction record;
        identify a linked provider that is registered with the user account in association with an automatic submission criterion, wherein the linked provider is identified from a plurality of linked providers based at least in part on the automatic submission criterion matching the transaction record;
        identify a submission template for the linked provider, the submission template specifying how to complete a submission using transaction data from the transaction record;
        obtain transaction data from the transaction record;
        automatically complete a submission based at least in part on the submission template and using the transaction data; and
        send the completed submission to a provider service associated with the linked provider.

2. The system of claim 1, wherein the machine-readable instructions further cause the computing device to at least authenticate with the provider service prior to sending the completed submission to the provider service.

3. The system of claim 1, wherein the machine-readable instructions that cause the computing device to complete the submission further cause the computing device to at least use machine learning to determine where to place individual portions of transaction data within the submission.

4. The system of claim 1, wherein the machine-readable instructions that cause the computing device to identify the linked provider associated with the transaction record further cause the computing device to at least identify the linked provider based at least in part on a merchant identifier specified in the transaction record.

5. The system of claim 1, wherein the machine-readable instructions that cause the computing device to identify the linked provider associated with the transaction record further cause the computing device to at least identify the linked provider based at least in part on an item listed in the transaction record.

6. The system of claim 1, wherein the machine-readable instructions further cause the computing device to at least:
    present a user interface to a client device, the user interface listing the transaction record; and
    obtain a selection of the transaction record from the client device.

7. The system of claim 1, wherein the machine-readable instructions further cause the computing device to at least periodically identify new transaction records associated with a user.

8. A method, comprising:
    identifying a transaction record and a user account associated with the transaction record;
    identifying a linked provider that is registered with the user account in association with an automatic submission criterion, wherein the linked provider is identified based at least in part on the automatic submission criterion matching the transaction record;
    identifying a submission template for the linked provider, the submission template specifying how to complete a submission using transaction data from the transaction record;
    obtaining transaction data from the transaction record;
    completing a submission based at least in part on the submission template and using the transaction data; and
    sending the completed submission to a provider service associated with the linked provider.

9. The method of claim 8, further comprising authenticating with the provider service prior to sending the completed submission to the provider service.

10. The method of claim 8, wherein completing the submission further comprises using machine learning to determine where to place individual portions of transaction data within the submission.

11. The method of claim 8, wherein identifying the linked provider associated with the transaction record further comprises identifying the linked provider based at least in part on a merchant identifier specified in the transaction record.

12. The method of claim 8, wherein identifying the linked provider associated with the transaction record further comprises identifying the linked provider based at least in part on an item listed in the transaction record.

13. The method of claim 8, further comprising:
    presenting a user interface to a client device, the user interface listing the transaction record; and
    obtaining a selection of the transaction record from the client device.

14. The method of claim 8, further comprising periodically identifying new transaction records associated with a user.

15. A non-transitory, computer-readable medium, comprising machine-readable instructions that, when executed by a processor of a computing device, cause the computing device to at least:
    identify a transaction record and a user account associated with the transaction record;
    identify a linked provider that is registered with the user account in association with an automatic submission criterion, wherein the linked provider is based at least in part on the automatic submission criterion matching the transaction record;
    identify a submission template for the linked provider, the submission template specifying how to complete a submission using transaction data from the transaction record;
    obtain transaction data from the transaction record;
    complete a submission based at least in part on the submission template and using the transaction data; and
    send the completed submission to a provider service associated with the linked provider.

16. The non-transitory, computer-readable medium of claim 15, wherein the machine-readable instructions further cause the computing device to at least authenticate with the provider service prior to sending the completed submission to the provider service.

17. The non-transitory, computer-readable medium of claim 15, wherein the machine-readable instructions that cause the computing device to complete the submission further cause the computing device to at least use machine learning to determine where to place individual portions of transaction data within the submission.

18. The non-transitory, computer-readable medium of claim 15, wherein the machine-readable instructions that cause the computing device to identify the linked provider associated with the transaction record further cause the computing device to at least identify the linked provider based at least in part on a merchant identifier specified in the transaction record.

19. The non-transitory, computer-readable medium of claim 15, wherein the machine-readable instructions that cause the computing device to identify the linked provider associated with the transaction record further cause the computing device to at least identify the linked provider based at least in part on an item listed in the transaction record.

20. The non-transitory, computer-readable medium of claim 15, wherein the machine-readable instructions further cause the computing device to at least:
   present a user interface to a client device, the user interface listing the transaction record; and
   obtain a selection of the transaction record from the client device.

* * * * *